Oct. 6, 1970 H. K. ZIMMERMAN 3,532,510
FILLED DOUGH PRODUCT AND METHOD OF MAKING THE SAME
Filed June 23, 1967 3 Sheets-Sheet 2

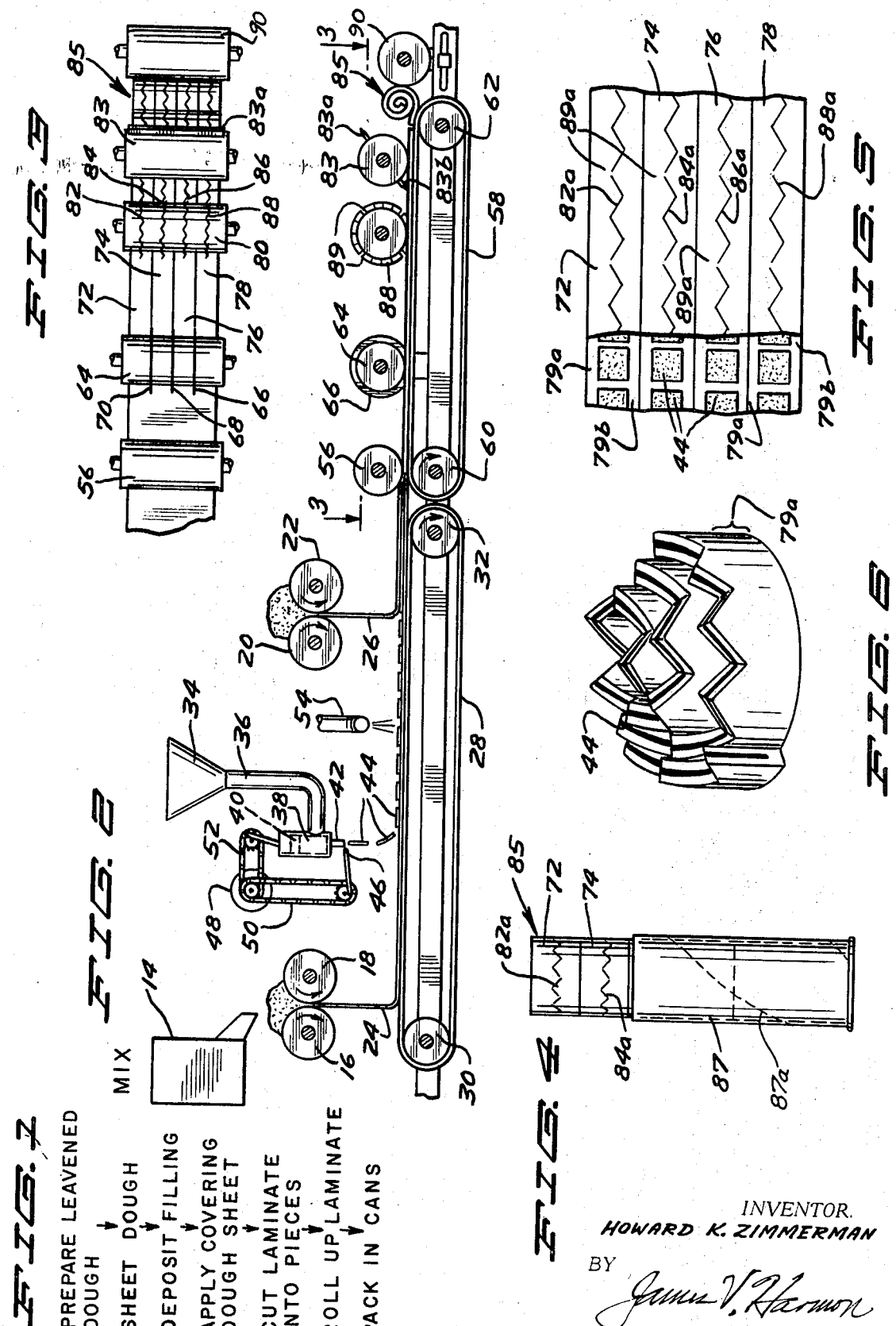

INVENTOR.
HOWARD K. ZIMMERMAN
BY
*James V. Harmon*
ATTORNEY

Oct. 6, 1970  H. K. ZIMMERMAN  3,532,510
FILLED DOUGH PRODUCT AND METHOD OF MAKING THE SAME
Filed June 23, 1967  3 Sheets-Sheet 3
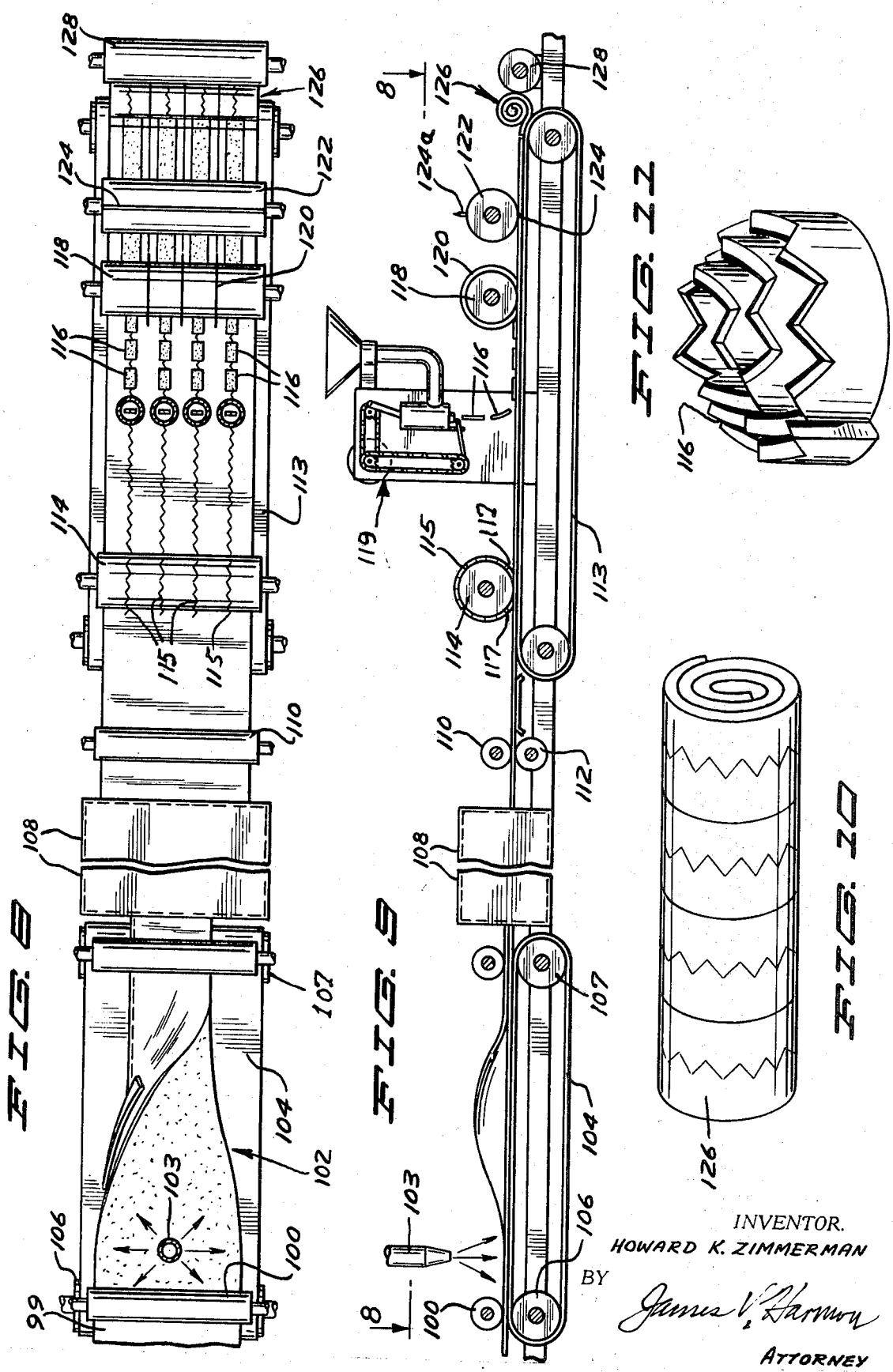
INVENTOR.
HOWARD K. ZIMMERMAN
BY James V. Harmony
ATTORNEY United States Patent Office 3,532,510
Patented Oct. 6, 1970

3,532,510
FILLED DOUGH PRODUCT AND METHOD OF MAKING THE SAME
Howard K. Zimmerman, 25 Hilltop Road, New Albany, Ind. 47150
Filed June 23, 1967, Ser. No. 648,348
Int. Cl. A21d 8/00, 13/08
U.S. Cl. 99—86                                                7 Claims

ABSTRACT OF THE DISCLOSURE

Unbaked filled rolls packaged in a pressure retaining container for refrigerated storage. A filling is placed between two sheets of dough which are sealed together along a filling-free marginal edge and then rolled up into a spiral to form filled rolls in which the sealed edges constitute the bottom faces of the rolls so that the product may be placed on a baking sheet and baked with the filling visible on the upper face but not in contact with the baking sheet.

---

The present invention relates to food products and to a method for manufacturing the same. The invention is particularly directed to an improved method of making a filled dough product of the type which can be toasted or baked by the consumer immediately prior to being served.

Of the filled dough products curently available, the dough is either partially or completely baked. There have been, as far as I am aware, no prior commercial products in which fresh unbaked dough has been held in contact with a filling material such as cheese, fruit or meat. While it has been common to package refrigerated dough with a fat or butter applied to its surface, the material is present as a discontinuous film which is often partially or completely absorbed into the dough.

The commercially available filled baked products of the type described have a tendency to dry out during shipment. Moreover, spoilage due to microorganism growth is a continuing problem. In addition, the dough must be formulated for high strength if the product is to withstand the rigors of shipment and storage. As a result, the taste and texture of these products is generally acknowledged to be substantially below that of freshly baked filled dough products.

In view of these and other deficiencies of the prior art, it is one object of the present invention to provide an improved refrigerated, unbaked dough product containing a filling material such as cheese, fruit or meat.

Another object of the present invention is the provision of an improved ready-to-bake dough product in which the dough has a light and tender texture but is nevertheless highly resistant to breakage during shipment.

A further object of the present invention is the provision of an improved ready-to-bake filled dough product which produces a hot, freshly baked food product characterized by having a tender fragile texture.

A further object of the present invention is the provision of an improved filled dough product of the type which is baked by the consumer immediately before being consumed and which can be prepared conveniently merely by removing it from the shipping container and baking the filled dough bodies.

A further object of the present invention is the provision of an improved filled unbaked dough product having a relatively long shelf life, e.g. on the order of 60 to 90 days.

Still another object of the present invention is the provision of an improved filled dough product of the type described in which an intimate combination of dough and filling material can be achieved during baking.

Still another object of the present invention is the provision of an improved filled dough product incorporating unbaked dough which requires no thawing prior to being baked.

A further object of the present invention is the provision of an improved dough product of the type described which can be readily produced on high speed, high capacity automatic equipment.

A still further object of the present invention is the provision of an improved refrigerated filled dough product of the type described in which a provision is made for preventing the leakage of filling material onto the baking sheets.

These and other more detailed and specific objects of the invention will be apparent in view of the following detailed description and the accompanying drawings, wherein:

FIG. 1 is a flow chart illustrating the steps performed in accordance with one embodiment of the invention.

FIG. 2 is a semi-diagrammatic side elevational view of the equipment employed for preparing filled dough products in accordance with one form of the invention.

FIG. 3 is a partial plan view taken on line 3—3 of FIG. 2.

FIG. 4 is a side elevational view showing a food product prepared in accordance with FIGS. 2 and 3 as it appears when being inserted into a shipping container.

FIG. 5 is a partial plan view of a filled dough product prepared in accordance with FIGS. 1 and 2 as it appears before being rolled up.

FIG. 6 is a perspective view of a finished filled dough body as it appears when placed on a cookie sheet just prior to being baked.

FIG. 8 is a plan view of an apparatus for preparing dough products in accordance with another form of the invention looking down from the horizontal cutting plane 8—8 of FIG. 9.

FIG. 9 is a side elevational view of the apparatus of FIG. 8.

FIG. 10 is a perspective view of a filled dough product prepared in accordance with the apparatus of FIGS. 8 and 9.

FIG. 11 is a perspective view of a filled dough product of FIG. 10 as it appears when placed on a cookie sheet just prior to being baked.

Figure 7:
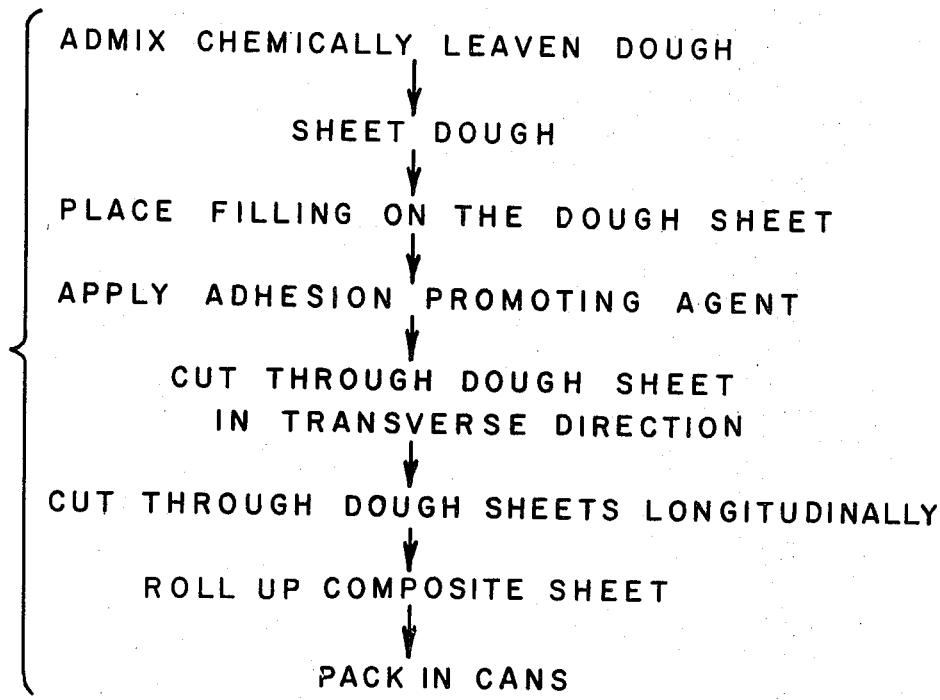
FIG. 7 is a flow chart showing the steps performed in accordance with another form of the invention.

Briefly stated, the invention consists of a refrigerated dough product containing stable filling material in which the dough surrounds and encloses a filling material. The filling can be any of a variety of materials which retain their identity and do not cause deterioration of the dough during storage. Typical fillings are peanut butter, cheese, meat, fruit and similar materials. In one form of the invention, the dough is sheeted and pressed against a similar flat sheet of dough with parallel strips of cheese positioned between the dough layers. The sheets are cut longitudinally before or after the application of the cheese layer with a straight cut between the cheese strips to provide a sealed joint on each side of each piece of cheese. Each of the resulting dough strips is then severed into two pieces by means of a zig-zag cut extending longitudinally through the center of each cheese strip. The resulting pieces are rolled into a spiral which is placed on a baking sheet and baked. In another form of the invention, the filled pieces are rectangular in shape and the filling is enclosed on all sides.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

In general the filling should have high temperature melting characteristics to minimize the loss caused by material running out of the dough when the biscuits are baked. The filling, moreover, should have low moisture absorption characteristics. It should also have a low level of enzyme and bacterial activities. The filling should also have the proper texture, flavor and should be chemically and biologically stable and should be compatible with the dough formula being used.

Of the great many kinds of fillings that can be employed, it is preferred to use those having a high fat content or those in which the fat and protein are bonded to another component. Other examples are sour cream, meat flavored fillings containing bacon bits, herbs, etc., fruit flavored paste, cinnamon and nut flavored paste, etc. The fruit flavored paste might include orange, pineapple, citrus bases and many others. Under some conditions chocolate flavoring can be employed. A meatless pizza can be employed as can fried sausage, pepperoni or bacon. Synthetic meats produced by spun soy protein, cooked chicken, ham and other meat bits can also be used.

A variety of different dough compositions can be employed to produce the desired characteristics in the finished product. To produce a dinner roll product, a chemically leavened dough combined with a cheese filling is used. One suitable dough has the following composition in parts by weight:

|  | Parts |
| --- | --- |
| Water | 34.2 |
| Flour | 48 |
| Sugar | 6 |
| Egg yolk | 1 |
| A monoglyceride emulsifier | 1.7 |
| Baking powder | 2.3 |
| Salt and other flavoring | 1.3 |
| Shortening | 4 |
| Chemical leavening agent | 1.5–2 |

The dough sheets are preferably rolled to between 1/16 and 1/4 of an inch in thickness. One-eighth inch in thickness has been found satisfactory.

In accordance with the form of the invention illustrated in FIGS. 1–6, either one or two relatively thin layers of dough are employed in combination with a filler material to form a multiple layered filled dough product. The product can either be baked as a spiral roll with the filling material positioned normal to the surface of the cookie sheet when baked or it can, if desired, be placed flat on the cookie sheet so that all of its layers are parallel to the surface of the sheet.

As a first step in preparing these products, a dough of a suitable composition is formulated and rolled into one or more sheets. The dough used in both upper and lower layers of the product preferably contains a chemical leavening agent. The materials required for preparing the dough are first assembled and mixed as shown at 14 (FIG. 2).

The dough is then placed, as shown in FIG. 2, between two sets of cooperating feed rolls including a first set designated 16 and 18 and a second set designated 20 and 22. Each set of rolls is driven and given feed directions and is spaced the appropriate distance apart to continuously form aligned dough sheets 24 and 26 of the desired thickness. As can be seen in FIG. 2, both the dough sheets pass continuously onto the upper surface of an endless conveyor such as a conveyor belt 28 entrained between rolls 30 and 32.

Located between the sets of feed rolls is a supply mechanism for the filling material. The supply mechanism consists of a filling supply hopper 34 that communicates through a duct 36 with four parallel and identical extrusion cylinders 38 positioned in lateral alignment, only one of which is shown. Mounted in each cylinder 38 is a plunger 40. During operation, reciprocation of plunger 40 forces the filling material in ribbon form out through an extrusion nozzle 42 connected to each cylinder. As the ribbon is extruded through each nozzle 42, it is divided into a plurality of laterally and longitudinally spaced sheets 44 by means of a transversely extending longitudinally reciprocating member such as a tightly stretched wire 46 that is moved back and forth across the opening of the extrusion nozzle 42 at timed intervals. Both the wire 46 and the plunger 40 are driven by means of a motive power unit such as an electric motor 48 connected together by means of power transmission members such as endless belts 50 and 52. In this manner the sheets of filling material 44 are deposited at uniform, longitudinally spaced intervals on the lower dough sheet 24.

Immediately after the sheets of filling material 44 have been deposited on dough sheet 24, an adhesion promoting agent such as water or water containing an edible bonding agent is applied from above through a spray nozzle 54. The dough strip 24 upon which the sheets of filling material 44 have been laid then passes from left to right beneath the strip 26. The strip 26 is bonded to the upper surface of the strip 24 and to the filling by a pressure roll 56.

As can be seen in FIG. 2, after the laminate passes beyond the roll 56, it travels onto a conveyor belt 58 entrained between longitudinally spaced transversely extending rolls 60 and 62. The belt 58 and the compressed laminate then travel under a transversely extending cutting roll 64 provided with three circumferentially extending laterally spaced circular blades 66, 68 and 70 which cut the laminate longitudinally into four side-by-side strips 72, 74, 76 and 78. Each of the strips 72–78 includes side edge portions 79a and 79b which are bonded together on opposite sides of the filling pieces 44. A small amount of water or other bonding agent applied with a spray head 54 serves to promote the adhesion between contacting layers. The strips 72–78 next pass beneath serrated cutter roll 80 which is provided with four aligned serrated cutting blades having laterally extending alternate right and left hand bends (undulations). The blades are designated 82, 84, 86 and 88. These blades are aligned with the center of each of the four strips 72–78.

The cuts produced by the undulated cutting blades 82–88 are designated 82a, 84a, 86a and 88a respectively. A plurality of radially extending circumferentially spaced serrations 89 are provided in the blades 82, 84, 86 and 88 for the purpose of forming connecting bands 89a (FIG. 5) that hold the adjacent pairs of rolls on either side of the undulated cut together until they are separated from one another manually. Because the cuts 82a–88a extend through the center of the filling material 44, the filling material 44 will be held out of contact with the baking pan when the biscuits are later separated from one another and baked. In this way, there is no opportunity for the filling material to flow onto the baking sheet and become burned or scorched. As can be best seen in FIG. 5, by cutting through the filling, the presence of the filling is immediately apparent both to the cook and to the person to whom the product is served. The product is thus not only nutritious and appetizing in flavor but has a very attractive appearance.

The rolls are separated from one another by the provision of a transverse cutting wheel 83 including diametrically opposed cutting blades 83a and 83b that extend the full width of the dough sheets 24 and 26 thereby severing all of the strips 72–78 simultaneously to provide rolls 85 of a predetermined diameter. The dough sheets are rolled up in any convenient manner as by means of a returning roll 90 or in any other suitable manner known to the art and placed in fiberboard pressure retaining cans 87 (FIG. 4). The cans 87 are of the pressure retaining type, i.e. adapted to withstand internal pressure produced by the carbon dioxide generated by the leavening agent. They are constructed with a weakened opening line designated 87a which enables the internal pressure to be dissipated almost instantly along the entire length of the can. This prevents the dough from being extruded in the event a small puncture were made during the opening procedure. The cans are maintained under refrigerated storage until used.

Refer now to FIGS. 7–11. A suitable dough composition is prepared as in FIGS. 1–6. The dough 99 is then sheeted conventionally and run between a roll 100 and a conveyor 102 including a belt 104 entrained over rolls 106 and 107. Shortening is applied as a thin layer by means of a shortening spreader indicated diagrammatically at 103. The dough sheet is then folded to envelop the shortening layer and sheeted by passing it between rolls 110 and 112 which reduce its thickness to approximately ¼ inch. The dough sheet 99 is then conveyed through a conventional lapping apparatus 108 to provide four layers of dough. The dough is then again sheeted to a thickness of about ¼ inch. If desired, the sheet can be sent through an additional lapper (not shown) and again folded back and forth upon itself to obtain a total of 36 layers of shortening in the finished product. The dough is then pressed between rolls 110 and 112 to a final thickness of about ⅛ inch.

The sheet 99 then passes onto driven endless belt conveyor 113 and is cut longitudinally by means of a cutting drum 114 having an undulated cutting blade 115. A plurality of radially extending circumferentially spaced cuts 117 can also be provided in the blades 115 for the purpose of providing connecting bands in dough sheet 99 that hold the adjacent rolls on either side of the undulated cut together until manually separated.

Pieces of a filling material 116 are then deposited at longitudinally spaced intervals along the lower dough sheet 99 overlapping the cuts made by drum 114. The application of filling can be carried out with an extruder 119 of the same kind described above. The strip 99 is then cut by drum 118 having circular cutter blades 120 and tranversely by a drum 122 having transversely extending blades 124. It can be seen that the cuts made by drum 114 extend through the center of the filling material 116 but the cuts produced by blades 120 will be on each side of the filling. Accordingly, when the spirally wound dough bodies are later separated from one another at the undulated cut and placed on a baking sheet, the filling material 44 will not flow onto the baking pan since the sheet 99 will be bonded to itself on the side of each piece opposite the undulated cut. In this way, there is no chance for the filling material to flow onto the baking sheet and become burned. The rolls are separated from one another by a transverse cutter wheel 122 including diametrically opposed cutter blades 124 and 124a that extend the full width of the dough sheet 99 thereby severing all strips simultaneously. Rolls 126 are formed in any convenient manner as by means of a returning roller 128 or in any other suitable manner known to the art.

Figure 12:
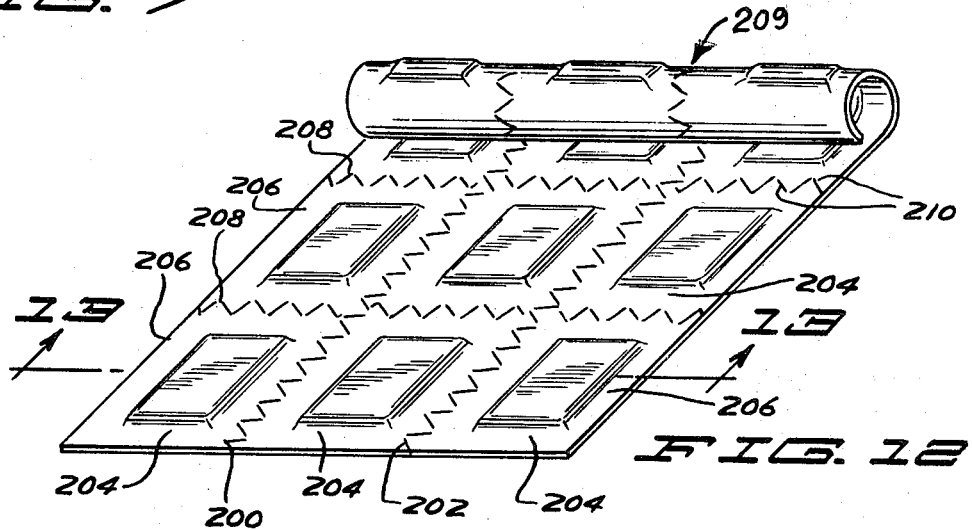
FIG. 12 is a perspective view of a filled dough product in accordance with another form of the invention.
Figure 13:
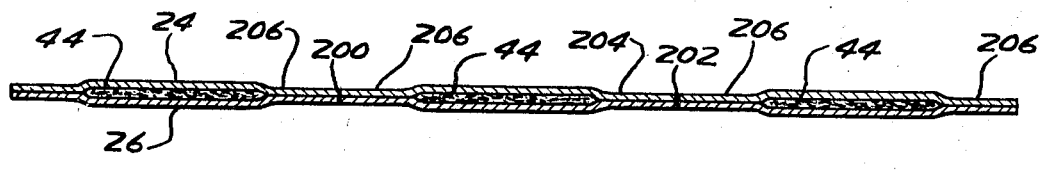
FIG. 13 is a transverse sectional view taken on line 13—13 of FIG. 12.

Refer now to FIGS. 12 and 13 which show a modified form of the invention in which a pair of dough sheets 24 and 26 are formed generally in the same manner as described in connection with FIGS. 1–6. A plurality of laterally and longitudinally spaced pieces of filling material 44 are applied exactly as described in connection with FIG. 2 except that the dough sheet is provided with two longitudinally extending undulated cuts 200 and 202 which are spaced intermediate the pieces of filling material 44. The filling is sealed on all sides by transverse and longitudinally extending sealing areas 204 and 206. The pieces of filling material 44 are thus totally enclosed. Transversely extending longitudinally spaced cuts 208, which in this case also have an undulate shape are provided by a cutter similar to cutter 83. All of the cuts 200, 202 and 208 are provided with spaced interruptions to produce connecting bands as described above for the purpose of keeping the rolls together until they are to be baked. As in the embodiment described in FIGS. 1–6, the composite sheet is rolled up longitudinally (the beginning of this process is shown in FIG. 12) to form a roll 209 similar to the roll 85 which is then packed in a pressure retaining container such as a fiberboard can similar to can 87. The rolls 85 and 209 are preferably proofed at a temperature of about 135° F. for about two hours after being placed in the fiberboard container.

While the filling has been applied in the examples given previously by extrusion, it can be applied in a variety of other ways. For example, by mechanically placing the pieces in the desired location or by spraying in the event the filling has sufficient fluidity. In the event the filling material is one which is resistant to flow when baked, it can be brushed or sponged over the entire surface of the dough sheet. In this case, the dough sheets will be bonded only to the layer of filling material and not to itself.

The invention successfully provides a filled dough based food product which has a tender texture but is highly resistant to damage or spoilage during storage and shipment. The filling is visible in some forms of the invention giving the product an attractive appearance but yet will not run onto the baking sheet and become scorched. By making the cuts through the filling material undulated, it will be immediatey apparent to the consumer that this end of the roll is not to be placed on the baking sheet. Accordingly, a mistake which might otherwise be made in preparing the product is avoided.

When a high sugar content filling is employed, I prefer to coat the adjacent layers of dough with a fat-containing substance that acts as a barrier to prevent the absorption of water from the dough.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An a new article of manufacture, a refrigerated, unbaked, pressurized food product including:

a gas-impervious, pressure retaining container body;

a food product packaged in the container body, said food product comprising:

a plurality of separate spiral roll dough bodies, said spiral roll dough bodies comprising a mixture of flour, water, shortening and a leavening agent adapted to produce a leavening gas, each of the spiral roll dough bodies containing a filling material composed of a food product other than dough and having no significant content of flour, said filling being compatible with said dough bodies;

the plurality of spiral roll dough bodies including at least one pair of said spiral roll dough bodies, said pair comprising two superimposed, aligned layers of dough containing said filling material centrally between them and spaced from the peripheral edges of said two superimposed, aligned layers; said two superimposed, aligned layers being sealed to each other about the periphery of said pair to enclose said filling material; said two superimposed, aligned layers and said filling material being cut at least almost completely through along a separation line traversing said pair of said spiral roll dough bodies to define on each side of said line one dough body of said pair; said pair being spirally wrapped about an axis generally parallel to said two layers of dough and generally transverse to said separation line so that the two spiral dough bodies of said pair lie axially adjacent one another along said axis with abutment thereof along said separation line;

the leavening gas present within the dough bodies producing an internal pressure in said container body in excess of atmospheric pressure during storage and shipment thereof;

said container body being constructed to release the pressure simultaneously throughout the substantial length thereof when the container body is opened; the two spiral roll dough bodies of said pair being separable from one another along said separation line after the container body has been opened, whereby the two spiral roll dough bodies can be placed on a baking sheet and baked with their formerly abutting edges facing upwardly after removal from the container body, such orientation exposing the filling material to view from above while maintaining the filling material out of contact with the baking sheet.

2. The product according to claim 1 wherein said plurality of separable spiral roll dough bodies containing filling material comprise a plurality of axially adjacent, abutting pairs of said spiral dough bodies which are substantially the same in construction as said one pair of said spiral dough bodies and which plurality of axially adjacent abutting pairs of said spiral dough bodies includes said one pair of said spiral dough bodies.

3. As a new article of manufacture, a refrigerated unbaked pressurized food product including: a gas impervious, pressure retaining container body; a food product packaged therein; said food product comprising a plurality of separable dough bodies, said dough bodies comprising a mixture of flour, water, shortening and a leavening agent adapted to produce a leavening gas, each of the dough bodies containing a filling material composed of a food product other than dough and having no significant content of flour, said filling being compatible with said dough bodies; the leavening gas present within the dough producing an internal pressure in said container in excess of atmospheric pressure during storage and shipment thereof, said container being constructed to release the pressure simultaneously throughout the substantial length thereof when the package is opened; the dough bodies being separable from one another after the package has been opened whereby the dough bodies can be placed on a baking sheet and baked after removal from the pressure retaining container;

said dough bodies comprising spiral rolls, each said spiral roll being composed of a pair of dough layers sealed to each other along one edge thereof, said sealed edge constituting one face of the spiral roll and said filling material extending all the way to the face of the spiral roll on the other side thereof whereby the spiral roll can be placed on a baking sheet and baked without the filling material contacting the baking sheet and said filling material being visible on the upper face of the spiral roll on said other side.

4. As a new article of manufacture, a refrigerated unbaked pressurized food product including: a gas impervious, pressure retaining container body; a food product packaged therein; said food product comprising a plurality of separable dough bodies, said dough bodies comprising a mixture of flour, water, shortening and a leavening agent adapted to produce a leavening gas, each of the dough bodies containing a filling material composed of a food product other than dough and having no significant content of flour, said filling being compatible with said dough bodies; the leavening gas present within the dough producing an internal pressure in said container in excess of atmospheric pressure during storage and shipment thereof, said container being constructed to release the pressure simultaneously throughout the substantial length thereof when the package is opened; the dough bodies being separable from one another after the package has been opened whereby the dough bodies can be placed on a baking sheet and baked after removal from the pressure retaining container;

said food product comprising a spirally wound body of dough having the form of a cylinder and including a plurality of longitudinally spaced apart transversely extending cuts therein defining a plurality of said dough bodies and some of the cuts being provided with connecting bands for holding the adjacent dough bodies to one another until the dough bodies are to be separated for baking;

said rolled dough body comprising two layers having the filling sealed therebetween, said dough bodies being sealed on opposite sides of the filling, at least some of the cuts extending through the filling material whereby separation of the dough bodies from one another results in spiral rolls wherein the filling material is exposed on one side of the roll and is covered by the sealed layers of the dough on the other side of the roll whereby the dough bodies can be baked with the filling visible on their upper surfaces and out of contact with the baking pan on their lower surfaces.

5. A process of preparing a refrigerated, unbaked, filled and pressurized dough-based food product, said process comprising:

compounding a flour-based dough composition by admixing flour, shortening, water and a chemical leavening agent;

preparing a filling material compatible with said dough composition and being composed of a food product other than dough and having no significant content of flour;

forming the dough into two sheets;

applying a body of said filling material to at least one of said sheets to cover a central portion of that one sheet which is of insufficient extent to reach the periphery of that one sheet thereby providing a filling material-free marginal edge portion of that one sheet surrounding the filling material thereon;

superimposing the other of said two sheets upon said body of filling material and said one sheet;

sealing the periphery of said other of said two sheets to the filling material-free marginal edge portion of said one sheet to enclose said body of filling material;

cutting said two superimposed sheets and said body of filling material at least almost completely through along a separation line traversing the composite constituted by said two superimposed sheets and said body of filling material to define, on each side of said line, one food product body;

spirally wrapping said composite about an axis generally parallel to said two superimposed sheets and generally transverse to said separation line so that the two spirally wrapped food product bodies lie axially adjacent one another along said axis with abutment thereof along said separation line;

packing the abutting spirally wrapped food product bodies within a pressure retaining container and maintaining the container under refrigeration until the product is to be consumed.

6. A process of preparing a refrigerated, unbaked filled and pressurized dough-base food product, said process comprising compounding a flour-based dough composition by admixing flour, shortening, water and a chemical leavening agent, preparing a filling material compatible therewith and being composed of a food product other than dough and having no significant content of flour, forming said dough into a sheet, applying the filling material to said sheet, severing said dough sheet into a plurality of pieces, rolling each of said several pieces and filling up upon itself to form a spiral roll having the form of a cylinder, packing the cylinder within a pressure retaining container and maintaining the container under refrigerated storage until the product is to be consumed;

said filling material being of an insufficient size to entirely cover the dough sheet thereby defining free marginal edges that extend beyond the edges of the filling material and bonding the abutting free marginal edges of adjacent sheets together to enclose the filling material on at least some sides including the side which constitutes the bottom face of the spiral roll.

7. A process for preparing a pair of unbaked, filled spirally wrapped food product bodies, said process comprising:
compounding a flour-based dough composition by admixing flour, shortening, water and a chemical leavening agent;
preparing a filling material compatible with said dough composition and being composed of a food product other than dough and having no significant content of flour;
forming the dough into two sheets;
applying a body of said filling material to at least one of said sheets to cover a central portion of that one sheet which is of insufficient extent to reach the periphery of that one sheet thereby providing a filling material-free marginal edge portion of that one sheet surrounding the filling material thereon;
superimposing the other of said two sheets upon said body of filling material and said one sheet;
sealing the periphery of said other of said two sheets to the filling material-free marginal edge portion of said one sheet to enclose said body of filling material;
cutting said two superimposed sheets and said body of filling material at least almost completely through along a separation line traversing the composite constituted by said two superimposed sheets and said body of filling material to define, one each side of said line, one food product body;
spirally wrapping said composite about an axis generally parallel to said two superimposed sheets and generally transverse to said separation line so that the two spirally wrapped food product bodies lie axially adjacent one another along said axis with abutment thereof along said separation line, whereby two spirally wrapped food product bodies may be separated from one another along said separation line and placed on a baking sheet and baked with their formerly abutting edges facing upwardly, such orientation exposing the filling material to view from above while maintaining the filling material out of contact with the baking sheet.

References Cited

UNITED STATES PATENTS 3,214,078 10/1965 Leezer _____ 99—172 XR
3,250,626 5/1966 Thelen _____ 99—86

OTHER REFERENCES

Sultan, "Cinnamon Biscuits and Muffin Biscuits," Practical Baking, Avi Publishing Co., Inc., Westport, Conn. 1965, pp. 196–197.

ALVIN E. TANENHOLTZ, Primary Examiner

J. R. HOFFMAN, Assistant Examiner

U.S. Cl. X.R.

99—92, 172, 192; 107—54